United States Patent
Tsau

(10) Patent No.: US 6,575,586 B1
(45) Date of Patent: Jun. 10, 2003

(54) LIGHTING UNIT

(75) Inventor: Bruce Tsau, Taipei (TW)

(73) Assignee: Behavior Tech Computer Corporation, Taipei (TW)

( * ) Notice: Subject to any disclaimer, the term of this patent is extended or adjusted under 35 U.S.C. 154(b) by 20 days.

(21) Appl. No.: 10/057,932

(22) Filed: Jan. 29, 2002

(51) Int. Cl.[7] .............................................. F21V 33/00
(52) U.S. Cl. ........................ 362/85; 362/253; 362/26; 345/170
(58) Field of Search .......................... 362/85, 800, 253, 362/24, 26, 109; 345/170; 200/313, 314, 172

(56) References Cited

U.S. PATENT DOCUMENTS

| | | | |
|---|---|---|---|
| 5,083,240 A | * | 1/1992 | Pasco .......................... 362/26 |
| 5,375,043 A | * | 12/1994 | Tokunaga ..................... 362/31 |
| 6,026,283 A | * | 2/2000 | Stephenson ................... 455/90 |
| 6,179,432 B1 | * | 1/2001 | Zhang et al. .................. 362/84 |
| 6,217,183 B1 | * | 4/2001 | Shipman ...................... 362/30 |

* cited by examiner

Primary Examiner—Alan Cariaso
Assistant Examiner—Ali Alavi

(57) ABSTRACT

The present invention relates to lighting unit that comprises at least a trough, a plurality of slots on a light penetration member attached at the bottom of a base, and at least a LED disposed in the trough. Fasteners are attached to the end of the feet of each key to join the key to the slots on the light penetration member. Each key is capable to move up and down freely with respect to the base. The LED connects to a power supply, the LED lights. All relevant keys will have an appropriate luminosity.

6 Claims, 4 Drawing Sheets

LIGHTING UNIT

BACKGROUND OF THE INVENTION

1. Field of the Invention

The present invention relates to a lighting unit used for input/output device, more particularly to a lighting unit used for keyboards. The lighting unit can be a luminary that is capable to illuminate hot keys of the keyboard.

2. Description of the Prior Art

To improve visual effect or fun of using computers, a single independent light source is added under each key of input/output device. Usually, a single independent Light Emitting Diode/LED is installed in the key cap of each key. In other words, the input/output device must use LEDs with the same counts as that of the keys and, therefore, consume more power and increase production costs.

U.S. Pat. No. 6,179,432 disclosed a lighting unit used in a keyboard. This keyboard has a base and a plurality of keys with key caps. An Electroluminescence (EL) is clamped between the base and each key cap. However, EL has a short average life and is more expensive than LED, and, therefore, is not practical for the electronic industry for which the cost is the most important operation factor.

To solve this problem, the present invention provides a lighting unit that is applicable to various types of input/output device and capable to illuminate the keys.

SUMMARY OF THE INVENTION

The primary object of the present invention is to provide a lighting unit used for input/output device. With the lighting unit of the present invention, only a minimum number of luminaries are needed to illuminate all keys and the cost is lowered down.

The lighting unit of the present invention comprises at least a trough and a plurality of slots on a light penetration member attached at the bottom of a base, and at least a LED disposed in the trough. Fasteners are attached to the end of the feet of each key to join the key to the slots on the light penetration member. Each key is capable to move up and down freely with respect to the base. Since the LED connects to a power supply, the LED lights. All relevant keys will have an appropriate luminosity.

Another object of the present invention is to provide a lighting unit that is applicable to various types of input/output device.

BRIEF DESCRIPTION OF THE DRAWINGS

The foregoing and other features and advantages of the present invention will be more clearly understood from the following detailed description and the accompanying drawings, in which.

DETAILED DESCRIPTION OF THE PREFERRED EMBODIMENT

With reference to FIGS. 1 to 4, a lighting unit of the invention is installed on a keyboard to make keys 12 illuminated.

Figure 1:
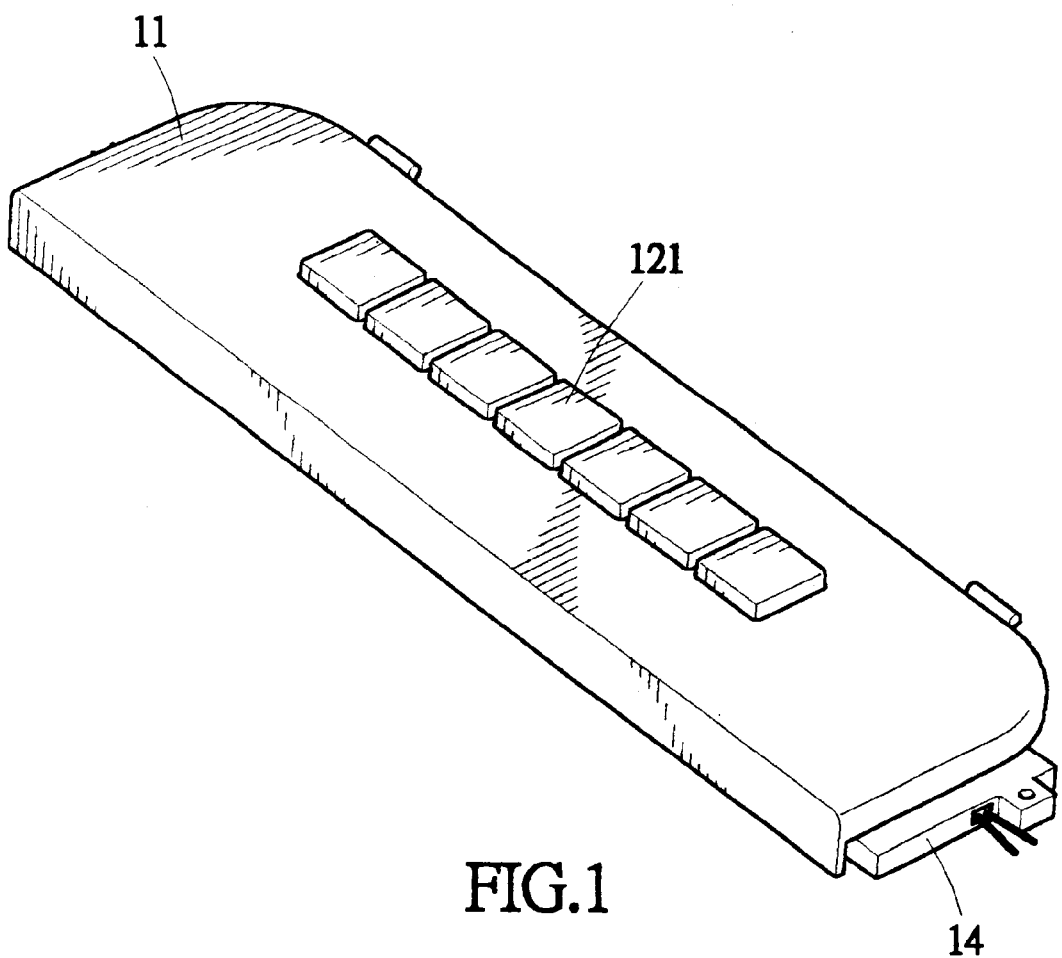
FIG. 1 is a perspective view of a lighting unit of the present invention.
Figure 2:
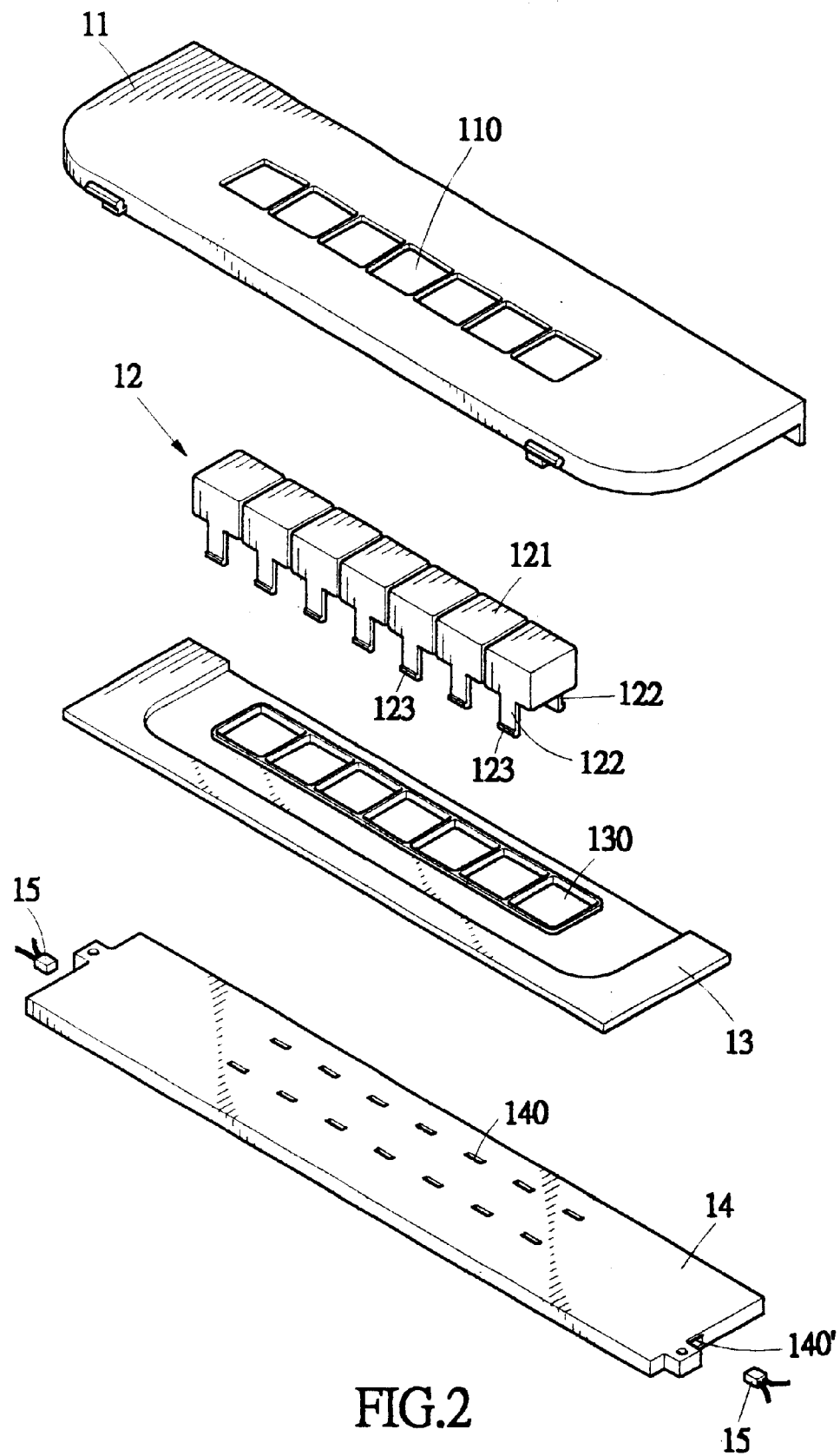
FIG. 2 is an exploded view of the lighting unit of the present invention.

With reference to FIG. 2, the lighting unit comprises a rectangular light penetration board 14 used as a light penetration member, a pair of LEDs 15, a base 13, an ornamental board 11, and a plurality of hot keys 12.

The light penetration board 14 is made of acrylic resin and disposed at the bottom of the base 13 of the hot keys 12. The light penetration board 14 has a plurality of slots 140 for the hot keys 12 to extend through and join the light penetration board 14. Each one trough 140' is disposed at each short side of the light penetration board 14 to contain one LED 15. As shown in FIG. 2, the direction of the slots 140 is parallel to the path of the light to produce a maximum luminosity.

The pair of LEDs 15 is disposed in the troughs 140' at the short sides of the light penetration board 14. When the LEDs 15 lights after connecting to a power supply, the whole light penetration board 14 will have an appropriate luminosity. Power supplies used for computer operation and internal batteries used for wireless keyboards can be used as power supplies of the lighting unit.

The base 13 is a rectangular board with a plurality of holes 130 to contain and fix the hot keys 12 individually and respectively.

The ornamental board 11 is an opaque board made of ABS resin and also has a plurality of holes 110 to contain and fix the hot keys 12 individually and respectively. Since the ornamental board 11 is disposed above the lighting unit and covers the base 13 and the tight penetration board 14, the light emitted from the LEDs 15 can only penetrate the hot keys 12. The ornamental board 11 is used only to decorate the lighting unit and is not an indispensable component.

The hot keys 12 are made of acrylic resin and each has a key cap 121 and a pair of feet 122 connecting to the key cap 121. The hot keys 12 are transparent and contained in the holes 110 of the ornamental board 11 and the holes 130 of the base 13 individually and respectively. Fasteners are added to the end of each pair of feet 122 for extending through the slots 140 of the light penetration board 14 and joining the hot keys 12 to the light penetration board 14 firmly. Various sizes are applicable to hot keys, so the hot keys 12 can have different sizes for different applications. Depending on the ingredients of the acrylic material, the hot keys 12 can be translucent.

The hot keys 12 extend through the holes 110 of the ornamental board 11, the holes 130 of the light penetration board 14 and the slots 140 sequentially and are jointly fixed on the bottom of the slots 140, so that the hot keys 12 are capable move up and down freely in the space formed by the ornamental board 11 and the base 13. A switch contact (not shown in the figures) on an internal circuit board is connected whenever one of the hot keys 12 is pressed.

Figure 3:
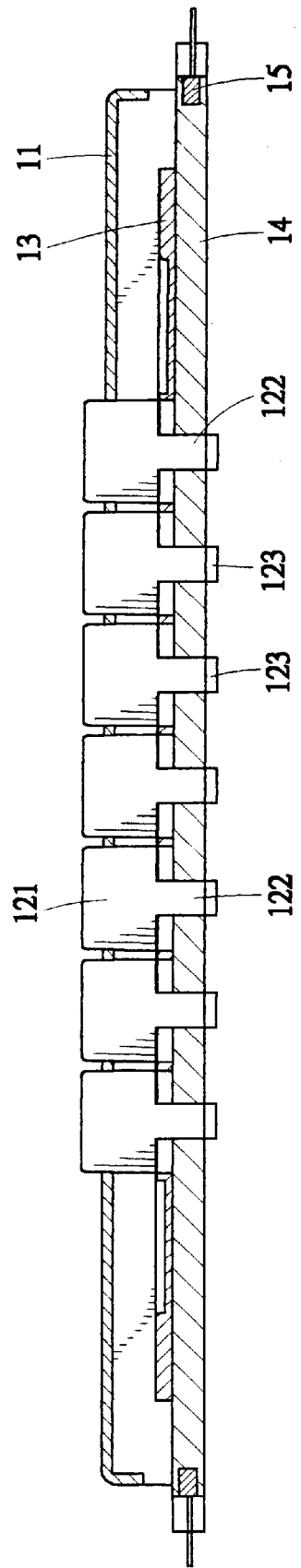
FIG. 3 is a cross-sectional view of the lighting unit of the present invention.
Figure 4:
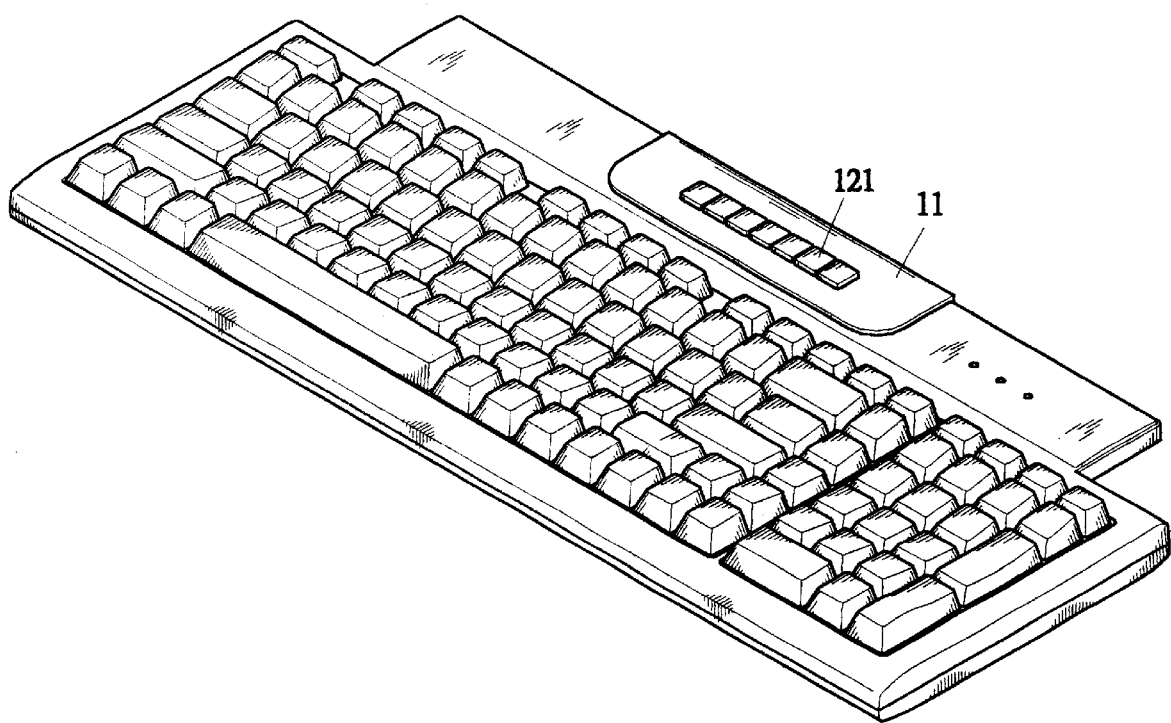
FIG. 4 shows the lighting unit of the present invention installed on a keyboard.

FIG. 3 is the lateral cross-sectional view of the lighting unit assembled. With the lighting unit of the present invention, only a few LEDs 15 are used to bring appropriate luminosity to the whole light penetration board 14, without the need to install light sources under the hot keys 12 individually. The production cost is, therefore, lowered down significantly. If the lighting unit 1 is short in length, only a LED 15 is needed to be installed in one of the troughs 140' of the light penetration board 14. If the lighting unit 1 is long in length, more troughs can be added to both the long sides of the light penetration board 14 to contain more LEDs.

Since the lighting unit 1 used in practical applications is usually not long in length, even one LED 15 installed in one of the troughs 140' of the light penetration board 14 is capable to bring appropriate luminosity to each hot key 12.

The present invention is applicable to various types of input/output device and instruments.

Although the present invention has been illustrated and described with reference to the preferred embodiment thereof, it should be understood that it is in no way limited to the details of such embodiment but is capable of numerous modifications within the scope of the appended claims.

What is claimed is:

1. A lighting unit used for input/output device, comprising:
   a plurality of keys each of which has a key cap and a pair of feet connecting to said key cap, fasteners being attached to the end of the feet;
   a base with a plurality of holes;
   a light penetration member having at least a trough and a plurality of slots and attached to the bottom of the base;
   at least a luminary installed in said trough; wherein
   each key extends through said holes of the base and said slots of the light penetration member sequentially, and extends through and is jointly fixed on the bottom of said slots with said fasteners so that said key is capable to move with respect to the base.

2. The lighting unit as claimed in claim 1, wherein said luminary is a LED.

3. The lighting unit as claimed in claim 2, wherein two LEDs are used as said luminary.

4. The lighting unit as claimed in claim 1, wherein the light penetration member is made of acrylic resin.

5. The lighting unit as claimed in claim 1, wherein the lighting unit further comprises an ornamental board with a plurality of holes.

6. The lighting unit as claimed in claim 1, wherein each foot of said key has a pair of fasteners to ensure a secured joint of the foot of said key and the light penetration member.

* * * * *